United States Patent
Slovick

(10) Patent No.: US 6,631,834 B2
(45) Date of Patent: Oct. 14, 2003

(54) SPARE TIRE CARRIER

(75) Inventor: Paul Slovick, Butler, PA (US)

(73) Assignee: Ibis Tek, LLC, Butler, PA (US)

( * ) Notice: Subject to any disclaimer, the term of this patent is extended or adjusted under 35 U.S.C. 154(b) by 0 days.

(21) Appl. No.: 09/919,775

(22) Filed: Jul. 31, 2001

(65) Prior Publication Data

US 2003/0024958 A1 Feb. 6, 2003

(51) Int. Cl.[7] .............................................. B62D 43/00
(52) U.S. Cl. ............................ 224/42.21; 224/42.28; 224/512; 414/463
(58) Field of Search .............................. 224/924, 42.12, 224/42.21, 42.24, 42.28, 512, 513, 517; 414/463, 465, 466

(56) References Cited

U.S. PATENT DOCUMENTS

| | | | | |
|---|---|---|---|---|
| 2,991,894 A | * | 7/1961 | Walker | 414/466 |
| 3,866,777 A | * | 2/1975 | Staranick et al. | 224/42.21 |
| 4,191,316 A | * | 3/1980 | Baumgartner | 224/924 |
| 4,485,945 A | * | 12/1984 | Ankeny | 224/42.21 |
| 4,679,717 A | * | 7/1987 | Hansen | 224/42.21 |
| 5,104,015 A | * | 4/1992 | Johnson | 224/42.21 |
| 5,183,192 A | * | 2/1993 | Mrozowski et al. | 224/42.21 |
| 5,186,371 A | * | 2/1993 | Jozefczak et al. | 224/42.21 |
| 5,538,168 A | * | 7/1996 | Burger et al. | 224/42.21 |
| 5,967,389 A | * | 10/1999 | Hutter et al. | 224/42.21 |
| 6,189,748 B1 | * | 2/2001 | Hutter et al. | 224/42.21 |

* cited by examiner

*Primary Examiner*—Nathan J. Newhouse
(74) *Attorney, Agent, or Firm*—Ference & Associates

(57) ABSTRACT

A bumper mounted spare tire carrier, suitable for very heavy tires, such as those used by off road vehicles and military vehicles.

5 Claims, 8 Drawing Sheets

SPARE TIRE CARRIER

FIELD OF THE INVENTION

The present invention relates generally to spare tire carriers, and more particularly to bumper mounted spare tire carriers suitable for very heavy tires, such as those used by off road vehicles and military vehicles.

BACKGROUND OF THE INVENTION

For a variety of reasons, it is often desirable for a vehicle to be equipped with a spare tire. Indeed, the desirabilty and necessity of carrying a spare tire is well established. Spare tires are generally stowed in designated locations with regard to the specific type of vehicle. The spare tire in an automobile, for example, is conveniently located within the trunk or cargo compartment. In light trucks and derivative recreational and off-road vehicles, the spare tire is typically supported against the underside of the vehicle or the rear of the vehicle. Various placements of a spare tire are employed for motor homes and travel trailers.

Under-chassis placement on vehicles that are used for off road or cross-country travel, including military vehicles, is particularly problematic. The depending assemblage of tire and mount present an encumbrance that is readily snagged or caught upon brush, rocks, and other terrain obstacles, impeding progress and incurring damage to the vehicle. Interior storage space, on the other hand, is generally inconvenient and wasteful of precious cargo space.

Spare tire carriers for such vehicles have traditionally been mounted at the rear of the vehicle. U.S. Pat. No. 1,849,855 issued to F. A. Stutsman et. al. on Mar. 15, 1932, discloses a tire carrier mounted at the rear body portion of a vehicle and which comprises a stationary part and a swingable tire carrying part that can be lowered to the ground in order to remove the tire from the carrier. If a vehicle, however, is equipped with a tailgate or some other type of rear closure assembly such as a door, a rear mounted tire carrier such as that of Stutsman et al. will interfere with the operation of the closure assembly.

To overcome this difficulty, many conventional spare tire carriers have been mounted on a pivotable frame to allow the carrier to be swung away from the rear closure assembly. Such carriers have been mounted either on the vehicle body, the vehicle bumper, or a combination thereof.

A relatively simple yet well known unit incorporates a pair of angularly disposed arms. The free end of each arm is hingedly affixed to the body of the vehicle. An arrangement for detachably securing a spare tire is typically carried at the apex of the arms. Rotation of the device, between stowed or normal position and the door access position, is about a vertical axis. This configuration, however, has proven to be less than satisfactory. A primary deficiency is associated with the mounting upon the body. Vehicular body panels are commonly fabricated of relatively lightweight material. The combined mass of the carrier and the tire, constantly vibrating when the vehicle is underway, imparts stress and fatigue to the body panel resulting in eventual material failure.

One device mounted on a combination of the vehicle body and rear bumper is disclosed in U.S. Pat. No. 4,817,834, issued to Raymond C. Weiler on Apr. 4, 1989. This device is primarily supported by the rear bumper, rotates about a vertical axis between a stowed or normal position and an position which permits access to the rear closure assembly, and requires a body mounted latch for retaining the spare tire in the normal position. Considerable stress, however, is placed upon the latch as a result of the inherent instability of the pivotable attachment to the bumper.

A device mounted a rear vehicle bumper is disclosed in U.S. Pat. No. 4,679,717 to Hansen, issued on Jul. 14, 1987. This device is supported only by the rear vehicle bumper, rotates about a vertical axis between a stowed or normal position and a position which permits access to the rear closure assembly, and does not include a body mounted latch for securing the tire in the normal position.

In addition to not interfering with the tailgate or some other type of rear closure assembly, a problem to be overcome with spare tire carriers mounted on the rear of a vehicle is the need to lift the tire off of the carrier or to lift the tire onto the tire carrier. This is a particular difficulty with tires for off road and military vehicles, which tend to be four to five times heavier than tires for commercial vehicles. By way of example, one such military vehicle where this is of particular concern is the High Mobility Multipurpose Wheeled Vehicle (HMMWV or HumVee) manufactured by AM General. While there are a number of different HumVee models, a tire for a typical HumVee weighs approximately one hundred and twenty two (122) pounds and costs approximately US$800. HumVee tires may include a runflat system which permits the tire to be driven flat for twenty (20) miles at thirty miles per hour (30 mph) and a CTIS (Central Tire Inflation System) which allows the driver to inflate or deflate the tire on the move. Adjusting the tire pressure impacts the traction provided by the tire. Such options increase the weight and cost of a tire. The weight of these tires is of particular moment, given the US military's guidelines which recommend the per person lift load be no greater than forty two (42) pounds. Under these guidelines, a minimum of three (3) people are needed to lift a spare tire. Because of the cost of each tire, it is preferred that any damaged tires which are replaced in the field be recovered for repair. The weight of the tires, however, and the need to lift the tire to the spare tire carrier inhibits such recovery.

U.S. Pat. No. 3,822,814, issued to Baldi on Jul. 9, 1974, discloses a bumper mounted spare tire carrier which addresses the difficulty of lifting a tire to the spare tire carrier. In this case, the spare tire carrier comprises a mounting bracket bolted to a rear bumper of a vehicle and the tire is attached to a rigid arm pivotally mounted at one end of the bracket. The arm extends beyond the attachment point of the tire and a handle is mounted at a distal end of the arm so that the tire can be lowed by grasping the handle, unlatching a latch and pivoting the arm and tire downwardly to the ground for easy removal or attachment of the tire.

Although the Baldi patent provides a tire carrier which allows operation of the rear closure assembly without interference and also permits the tire to swing downwardly to make mounting and removing the spare tire less burdensome, one has to swing the tire downwardly and afterwards upwardly every time one wishes to use the tailgate or other rear closure assembly of the vehicle to which the device of Baldi is attached. U.S. Pat. No. 5,186, 371 to Jozeczak et al., issued on Feb. 16, 1993, discloses a spare tire carrier affixed to the body of the vehicle that allows the tire to swing downwardly for easy removal and which is adapted to swing from a latched position adjacent to the rear portion of the vehicle to an open position. The device of Jozeczak et al., however, requires a body mounted latch for retaining the spare tire in the normal position and suffers from the deficiencies discussed above of body mounted carriers and carriers which require a body mounted latch for retaining the spare tire in the normal position. Moreover, a tremendous amount of leverage is required to lift the tire above its center of gravity. Devices like the device of Jozeczak et al., however, require the tire to be lifted above its center of gravity because doing so results in a tire in a stowed position that is very stable without the need for a powerful locking mechanism as the weight of the tire acts to hold the tire in place.

For off road vehicles, and military vehicles in particular, the spare tire carriers disclosed in the art are not suitable. Simply put, these carriers are designed for on road use and cannot withstand the stresses and strains placed upon them when supporting a larger tire in an off road environment. By way of comparison, a tire for a passenger car typically measures approximately twenty seven (27) inches in diameter and has a tread width of approximately seven (7) inches. A tire for a HumVee, however, measures thirty seven (37) inches in diameter and has a tread width of twelve (12) inches. The strains and stresses associated with supporting such tires is great. For example, a HumVee is capable of scaling an eighteen (18) inch vertical wall, with approach and departure angles of seventy two degrees (72°) and thirty seven and one half degrees (37.5°). Operational considerations such as these render carriers of the type disclosed in the art unsuitable. Furthermore, the increased weight of the larger tire precludes the lifting of the tire required by the carriers of the type disclosed in the art. The HumVee provides at least sixteen (16) inches of ground clearance, and rides high off the ground. Indeed, spare tire carriers for the HumVee typically mount the spare tire approximately five (5) from the ground. Thus, those carriers disclosed in the art which require lifting of the tire and/or carrier are also particularly unsuitable for use on off road vehicles such as a HumVee.

Because of the unsuitability of the carriers in the art which address the lifting of the tire to/from the carrier, the disclosures of these references have not been implemented for military vehicles such as the HumVee and lifting of the tires mounted to the carrier is done through brute force. FIG. 1 shows a conventional spare tire carrier for the HumVee and its civilian counterpart (the Hummer) which is currently available from AM General. Plate 10, which includes two flanges having receptacles for receiving the carrier, is mounted to rear bumper 15 by bolts 20. Carrier 30 is inserted through the flanges of plate 10 at reference numeral 40. Thus, the carrier pivots about reference numeral 40. The carrier is secured from pivoting by latch 50, and the tire is mounted to the carrier at reference numeral 60. The ground clearance for a HumVee is typically thirty six (36) inches, and mounting point 60 is substantially higher, approximately sixty (60) inches from the ground.

One solution to the problem of lifting a tire to the carrier for a HumVee is shown at [http://]humvee.net/hid/tire/shoist.html. FIG. 2a shows the various parts of this hoist. FIG. 2b shows this hoist in operation. FIG. 2c shows the use of the tire carrier prop of this hoist to secure the carrier in the open position. FIG. 2d shows the inside of the tire carrier without the base of this hoist. There are, however, many drawbacks to such a hoist. Such drawbacks include the number of separate parts of the hoist, which are stored separately from the carrier when not in use, and that the hoist is not integral with the carrier. The need to separately store a number of individual parts for later assembly is not well suited for use in the off road environment, including the military environment.

In view of the foregoing, several needs have been recognized, among which is a need to provide a spare tire carrier capable of supporting the heavy tires used on off road vehicles, including military vehicles, and in which lifting of the tire is minimized.

SUMMARY OF THE INVENTION

In accordance with a preferred embodiment of the invention that will be illustrated herein, the problem carrying a spare tire on a vehicle is addressed. The present invention permits a spare tire to be carried on the rear of a vehicle while not interfereing with the functionality of the rear closure of the vehicle and other components situated at the rear of the vehicle, such as a trailer hitch.

The present invention provides an apparatus for carrying the spare tire for a vehicle, the apparatus comprising: a swing arm member pivotably attached to the vehicle at one end; a pivot arm pivotably attached to the swing arm and supporting a spare tire for movement between raised position wherein the spare tire is located above ground and lowed position wherein the spare tire contacts the ground; a tire support fixedly connected to the pivot arm for mounting the spare tire; a mechanism which secures the pivot arm to the swing arm once the pivot arm is substantially parallel to the swing arm; a mechanism which secures the swing arm so that it will not pivot.

In another aspect, the present invention provides an apparatus for carrying the spare tire for a vehicle, the apparatus comprising a tire support for mounting a spare tire including at least one lug for securing the tire to the tire support and material extending past the lug which supports the tire so that the tire may be rotated to align the tire with the lug.

For a better understanding of the present invention, together with other and further features and advantages thereof, reference is made to the following description, taken in conjunction with the accompanying drawings, and the scope of the invention will be pointed out in the appended claims.

DESCRIPTION OF THE PREFERRED EMBODIMENTS

At least one embodiment of the present invention broadly contemplates a bumper mounted spare tire carrier. While the present invention is suitable for heavy tires, it should be understood the invention may also be used with lighter tires. Also, while the present invention is suitable for use in an off-road environment, it should be understood the present invention may also be used in less demanding environments.

Though embodiments of the present invention will now be described with reference to a particular military vehicle (HumVee), it should be understood the invention is not limited to use on this particular vehicle and the invention may be used on any vehicle, military or civilian, car or truck, where the need arises for the present invention.

Figure 1:
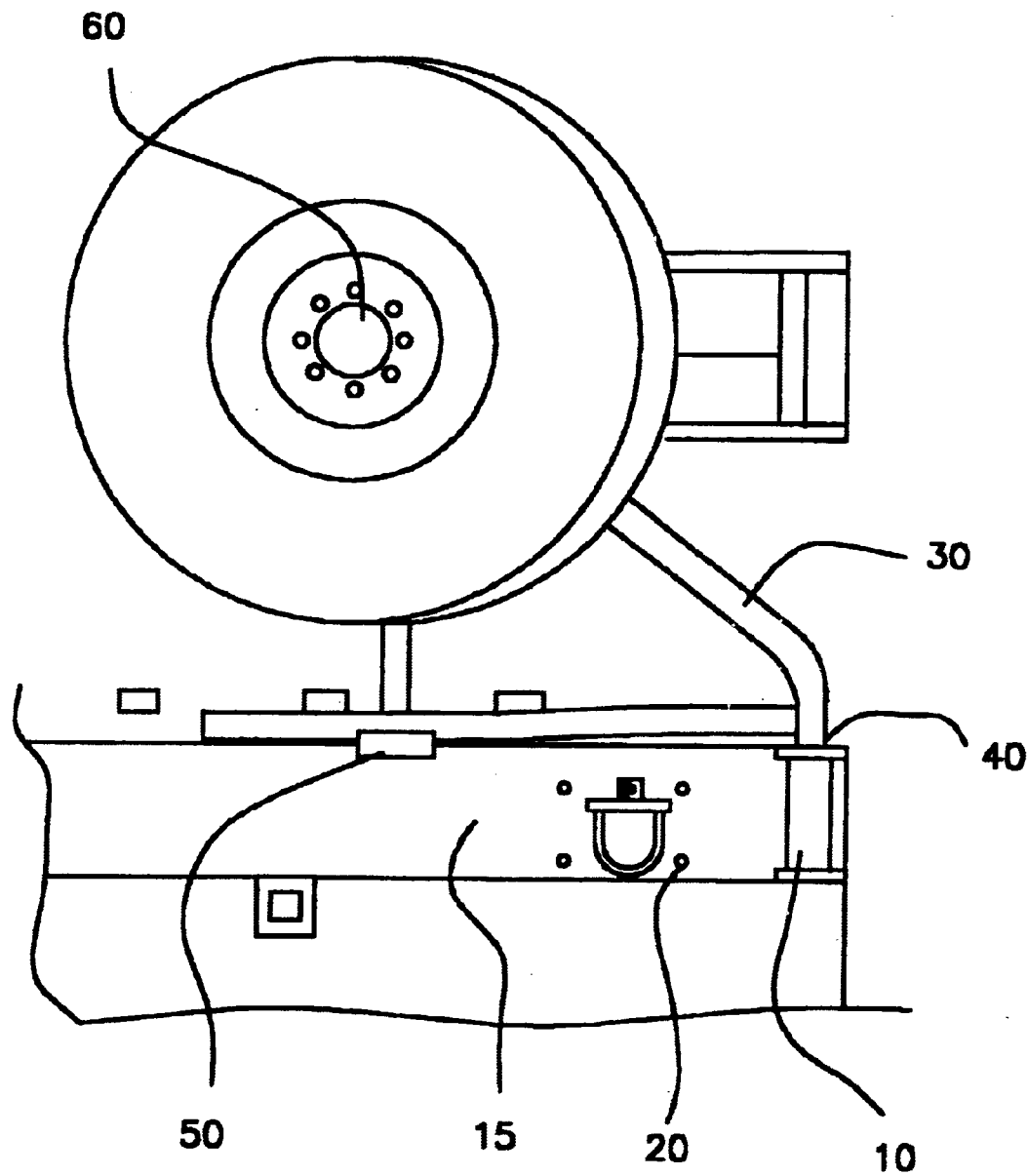
FIG. 1 shows a spare tire carrier for a HumVee available from the vehicle manufacturer.
Figure 2A:
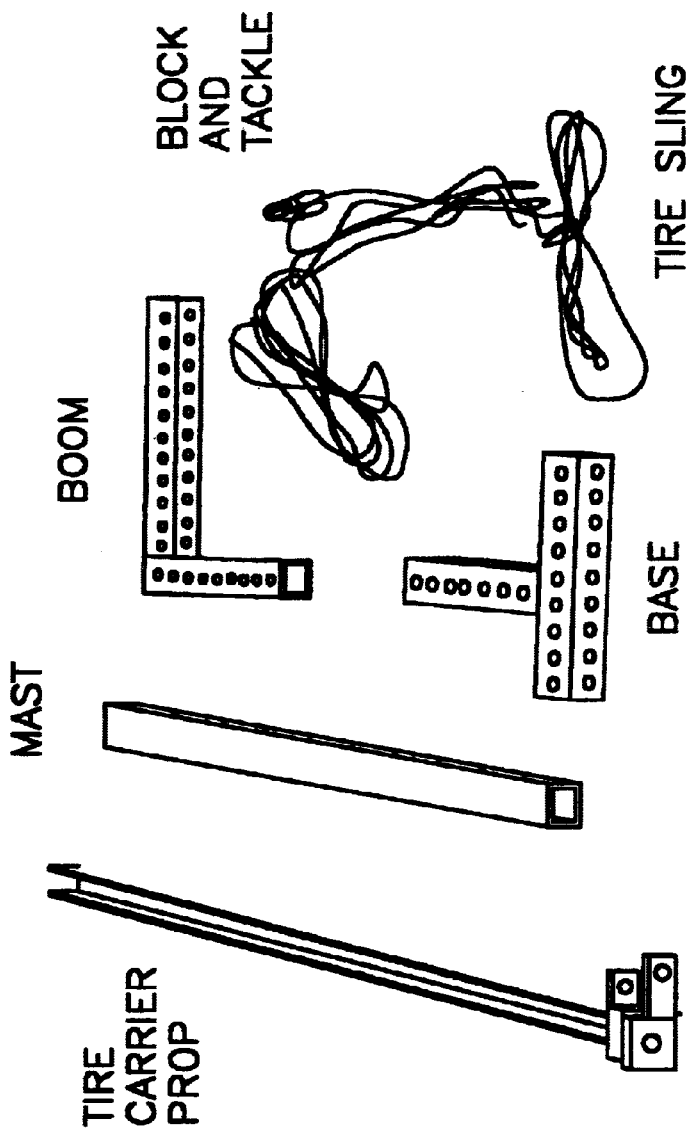
FIG. 2(a)a shows the parts for a commercially available spare tire hoist for the HumVee.
Figure 2B:
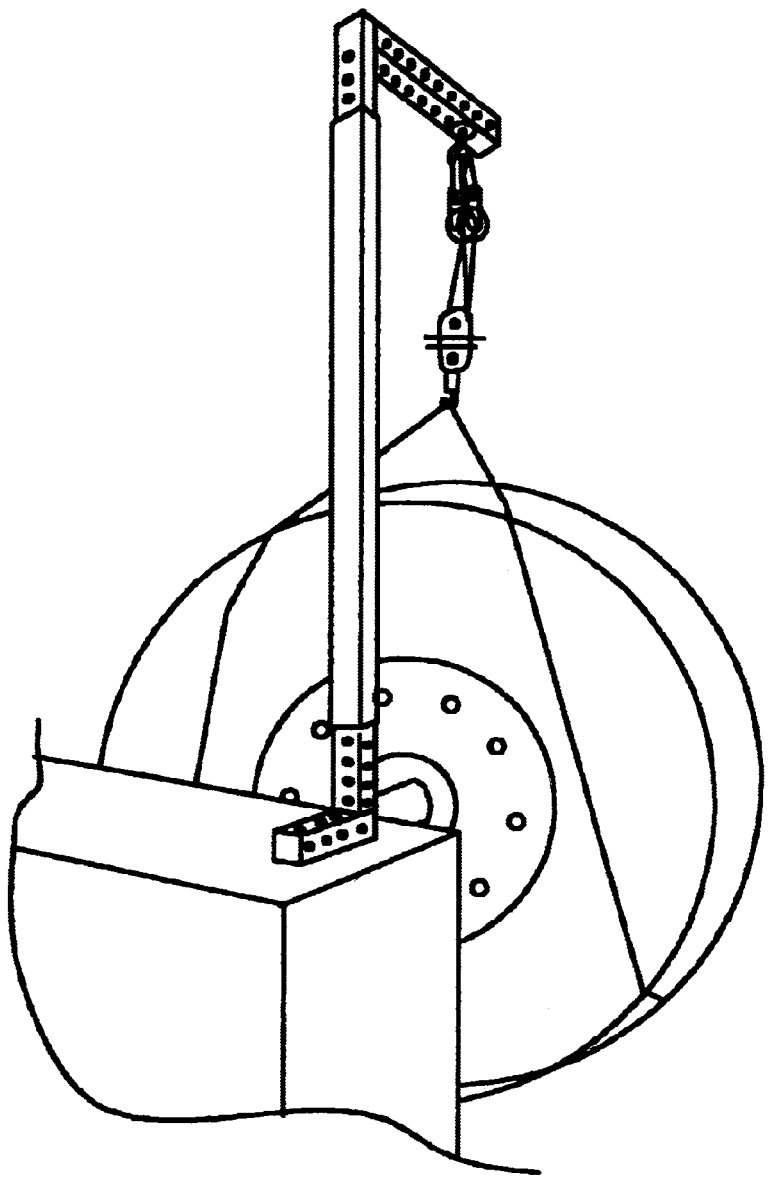
FIG. 2(b) shows the hoist of FIG. 2(a) in position.
Figure 2C:
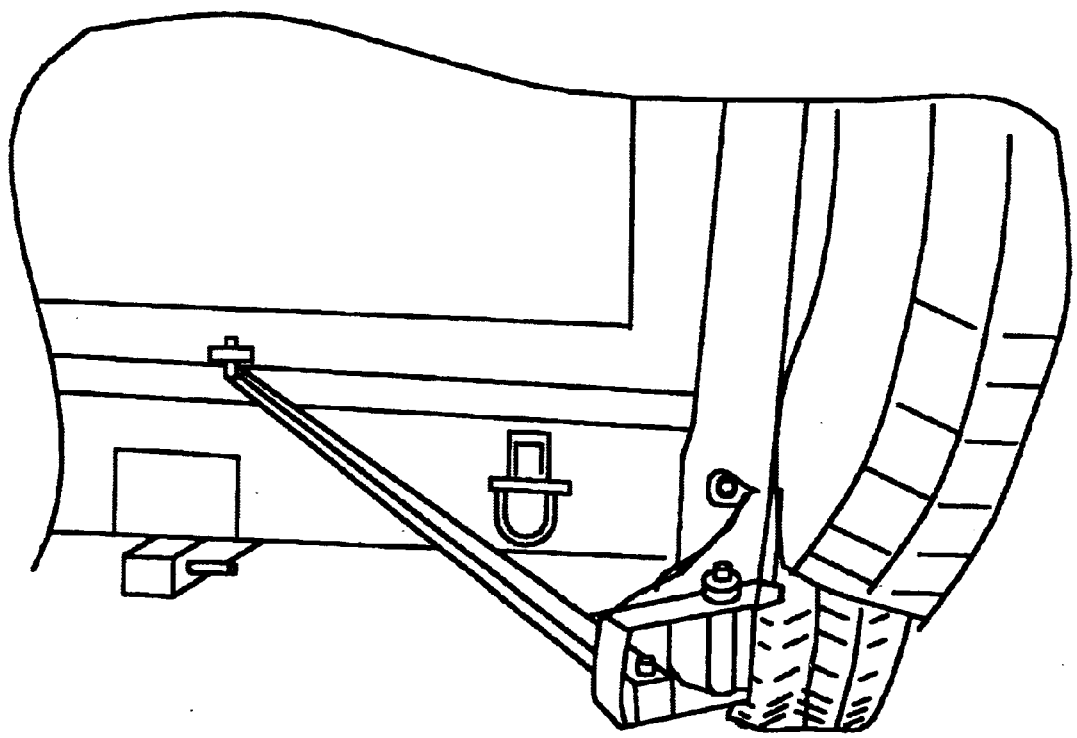
FIG. 2(c) shows the tire carrier prompt of the hoist of FIG. 2(a) in position.
Figure 2D:
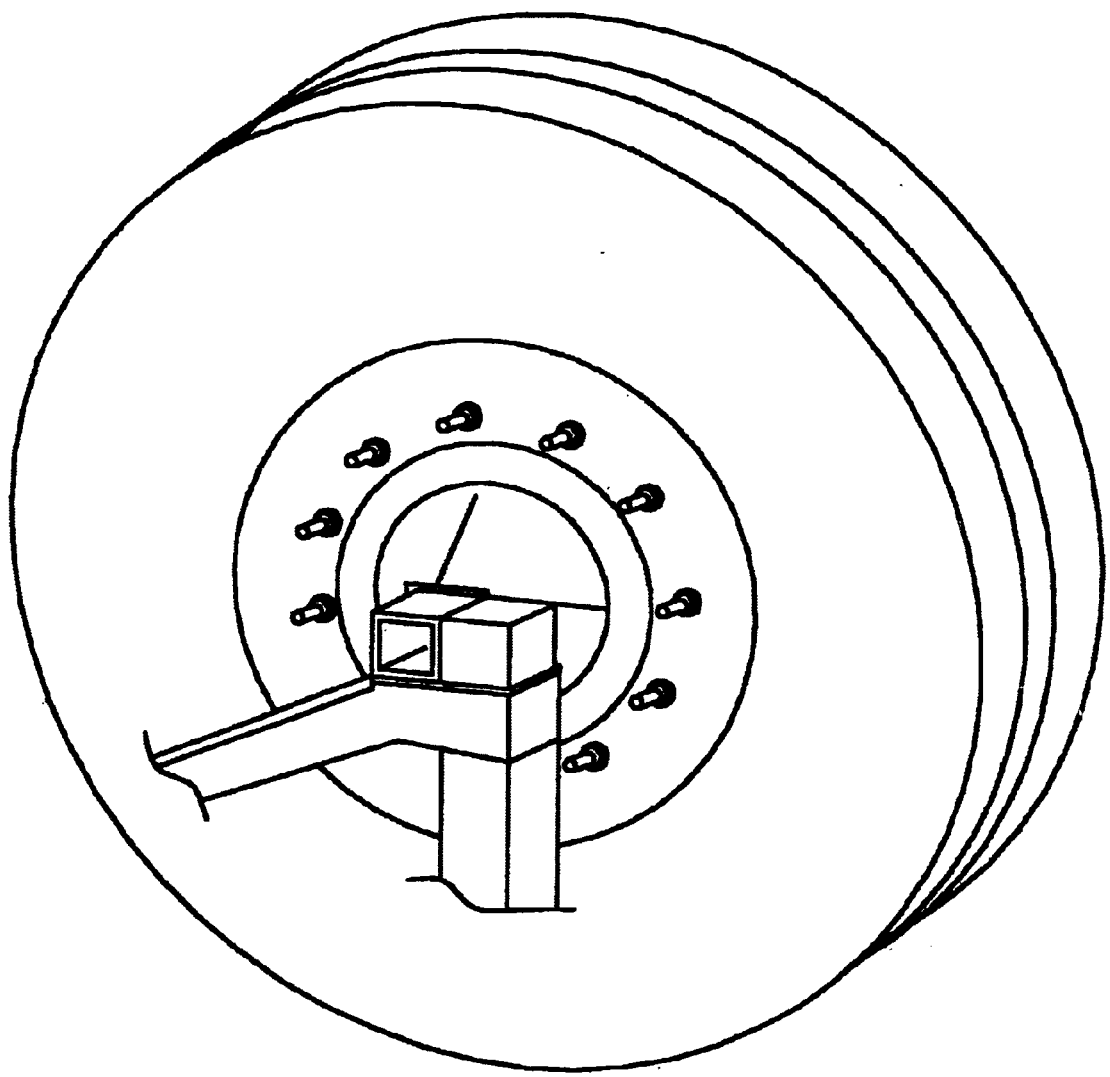
FIG. 2(d) shows the inside of the tire carrier without the base of the hoist of FIG. 2(a).
Figure 3:
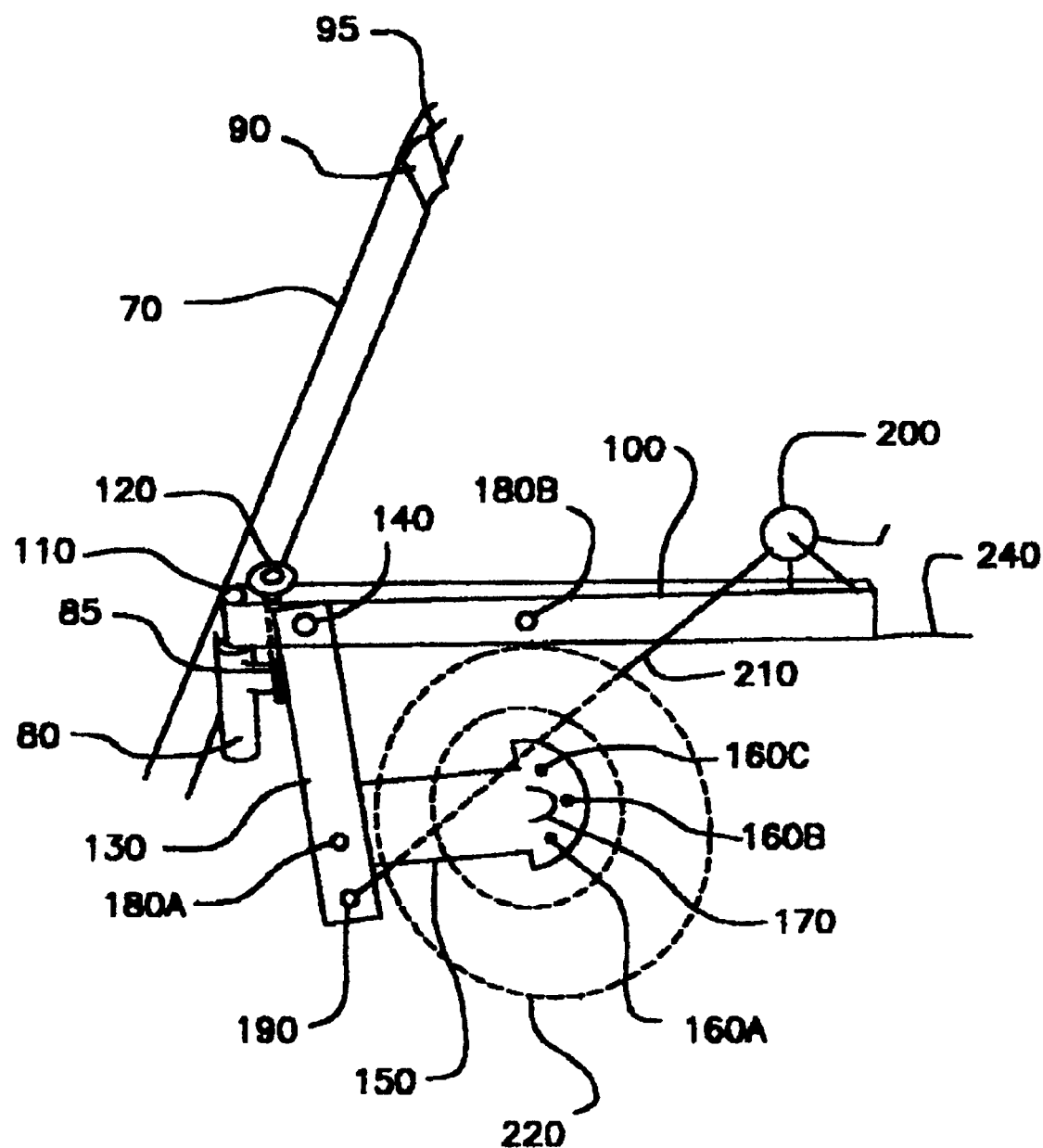
FIG. 3 shows the spare tire carrier of the present invention in an open position.

Referring now to FIG. 3, a spare tire carrier in accordance with the present invention is shown in the open or non-secured position. Reference numeral 70 denotes the bumper of the vehicle. Reference numeral 80 denotes a first mounting bracket, which is configured to permit a pivot about point 110 and to swing secure arm 100 in a fixed position through tab 85 when locking pin 120 is inserted through arm 100 (at tab 105-not shown) and tab 85. It is preferred that tab 85 contain at least two tabs, to assist in the prevention of sissoring. Bracket 80 is fixedly secured to bumper 70. Preferably through bolting to one of the attachment points provided on a standard HumVee bumper. Bracket 90 is a second bracket which is used to secure arm 100 in a closed position when locking pin 120 is inserted through tab 240 and tab 95. Brackets 80 and 90 preferably have slight edge extending downwardly from the top to bracket the top of bumper 70. As with tab 85, it is preferred that tab 95 contain at least two tabs, again to assist in the prevention of scissoring. While separate locking pins may be used, since it has been found to be most convenient to use one locking pin 120 to secure the arm 100 in both the closed and open position. Locking pin 120 preferably has a handle, a rod shaped portion with a hole through it permitting a clevis pin to be inserted therethrough and thereby securing locking pin 120 in place.

Pivot arm 130 is pivotably affixed to arm 100 at second point 140. Arm 100 and pivot arm 130 preferably both contain holes 180, which align when pivot arm 130 is parallel to arm 100 and which permits a locking pin (not shown) similar to locking pin 120 to be inserted therein thereby securing pivot arm 130 to arm 100. Preferably, this locking pin is inserted from the rear, thus the head (or handle) of the locking pin is disposed towards the rear of the vehicle and the vehicle rear further acts to limit movement of the locking pin out of holes 180. Pivot arm 130 also contains an attachment point 190 whereby cable 210 is attached, preferably through the use of a clevis pin. Cable 210 is connected to winch 200 which is mounted onto arm 100. The presently preferred winch is Fulton Model NO. XLT14Z from Performance Products, Inc., Mosine, Wis. This is a manual winch and has a 1400 pound rating and provides a mechanical advantage of 43:1. Other winches, however, may be used, including electrically operated winches. It may also be preferable to have the winch ratchet both up and down to assist the operator in controlling the winch movement. It should be noted that while a cable and winch arrangement is presently preferred, a handle or similar device may also be attached at attachment point 190 to facilitate manual operation.

Attached to pivot arm 130 is tire support 150. Preferably attachment is through the use of welding, although attachment may be in any manner which is suitable. While not shown in this view, tire support 150 is preferably offset to accommodate the thickness of the tire while having tire 220 (shown in dashed lines) as close as feasible to the plane of bumper 70. Should it be desired, however, the offset could be greater, which would increase the distance between bumper 70 and tire 220. Located at the end of the tire support disposed from pivot arm 130 is the portion of tire support 150 to which tire 220 is attached. This end of tire support 150 includes lugs 160 and tire spinner 170. Although any appropriate lug may be used, it is presently preferred the lugs match those on the wheels of the vehicle to which the spare tire carrier of the present invention will be mounted. Tire 220 is attached to lugs 160 using lug nuts (not shown), and if the lugs are the same as those on the vehicle wheels, the tire carrier provides extra lug nuts should one of the wheel lug nuts become unavailable. Furthermore, three lugs 160 are shown, and are presently preferred, although it should be understood that any number of lugs may be provided. Providing three lugs merely provides two extra lug nuts, as one lug and nut are sufficient to secure tire 220 to tire support 150.

Tire spinner 170 is particularly useful in mounting tire 220 to tire support 150, as it permits tire 220 to be supported while the rim of tire 220 is aligned with lug nuts 160. In particular, tire spinner 170 extends out from tire support 150 past the length of lugs 160. This permits tire spinner 170 to support the weight of tire 220 while the lug holes in the rim of tire 220 are aligned with lugs 160. Indeed, during preferred operation, winch 200 is operated such that cable 210 lowers pivot arm 130 to the point where a tire may be leaned up against tire support 150 such that tire spinner 170 is protruding through the interior opening in the rim of tire 220. Winch 200 is then operated such that cable 210 raises pivot arm 130 slightly until tire 220 is off the ground. At that point in time, tire 220 is spun around tire spinner 170 until the lug holes in the rim align with lugs 160. Tire 220 is then pushed back and lug nuts are applied to lugs 160 to secure tire 220 to tire support 150. The problem of having to lift the tire to align the lug holes in the rim with the lug nuts is eliminated. As shown, tire spinner 170 is circular in nature and is solid for approximately two-thirds of a circle. This is a design choice which uses less material. The important consideration is for tire spinner 170 to extend far enough around in circumference to meaningfully connect with the interior opening in the rim of tire 220 when pivot arm 130 is in the lowered position. Indeed, there is no reason why tire spinner 170 could not have an unbroken circumference. It should be noted the arrangement of lugs 160 and tire spinner 170 may be used in environments other than that of the present invention.

Figure 4:
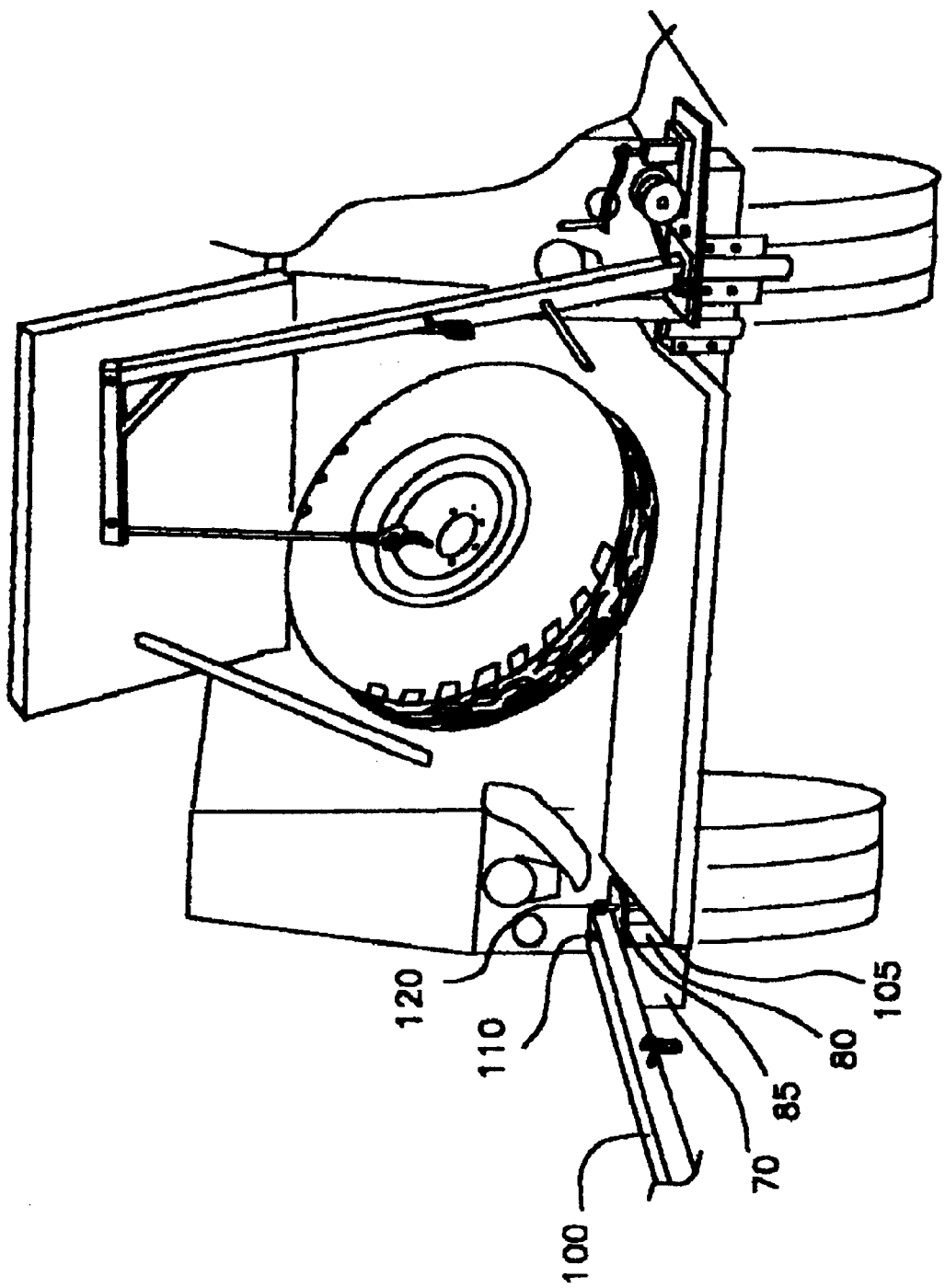
FIG. 4 shows a portion of the spare tire carrier of the present invention when the spare tire carrier is in the open position.

Referring now to FIG. 4, a portion of the spare tire carrier of the present invention is shown when the spare tire carrier is in the open position. Like reference numerals are used to denote like components. As shown in this figure, the spare tire carrier does not hinder the tailgate of the vehicle from operating, thereby permitting cargo or other items to be placed in the cargo area of the vehicle.

Figure 5:
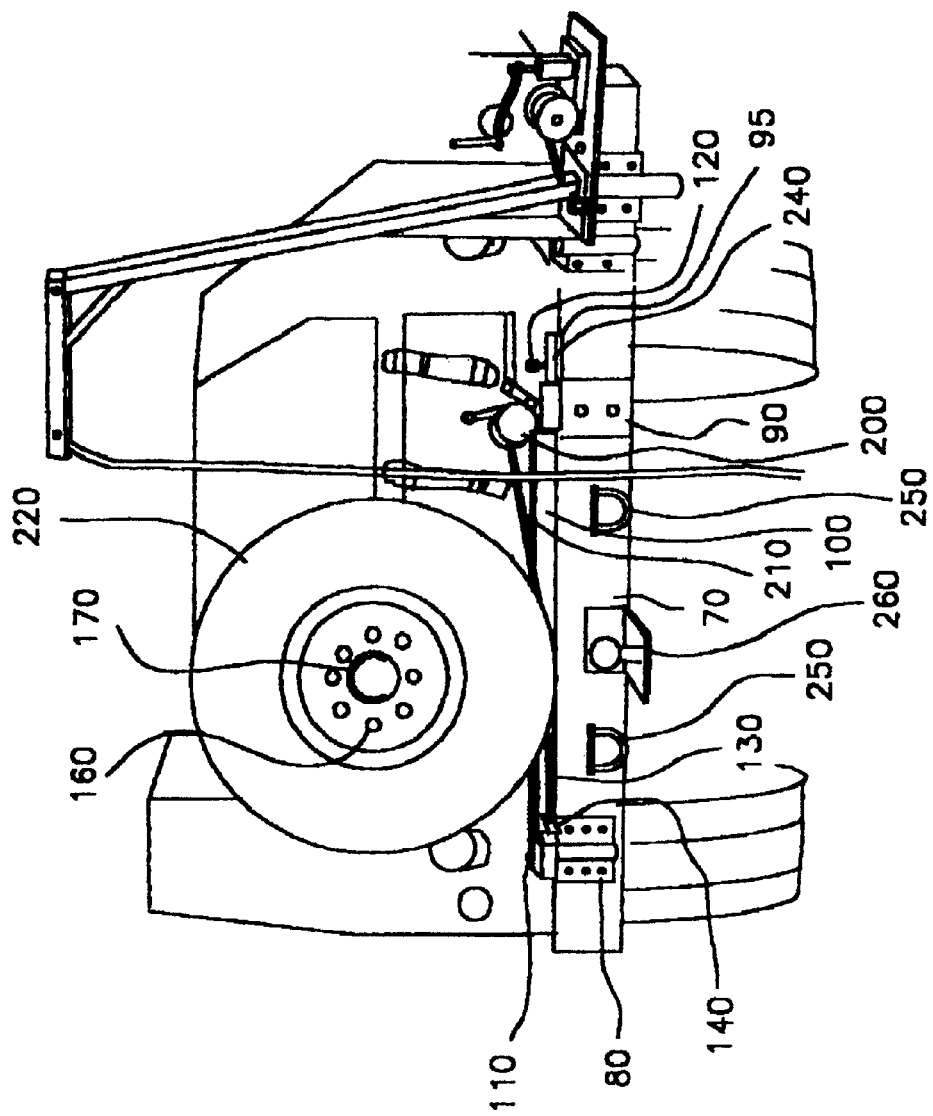
FIG. 5 shows the spare tire carrier of the present invention in the closed position.

Referring now to FIG. 5, the spare tire carrier is shown when the spare tire carrier is in the closed position. Like reference numerals are used to denote like components. This view clearly shows that the spare tire carrier of the present invention does not interfere with the ability to use other devices mounted on bumper 70 of the HumVee, specifically tire downs 250 and hitch 260. As shown, the spare tire 220 is slightly off center of the vehicle. This results from preferred design choices, but if a centered appearance (or any other appearance is desired), such could be obtained using the present invention.

Any materials appropriate for the load of the spare tire to be supported may be used in the construction of the spare tire carrier of the present invention. It is preferred, however, that two by two by quarter (2×2×¼) square tubing be used for the arms 100 and 130. Likewise, any appropriate securement mechanisms may be used, although presently preferred are at least five eighths (⅝) bolts. Similarly, any appropriate pivot pin at pivot point 110 may be used, although it is presently preferred the pin be at least one (1) inch in diameter.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. An apparatus for carrying a vehicle spare tire, said apparatus comprising:

a swing arm for being pivotably attached to the vehicle at one end and for being pivotable about a pivot axis;

a pivot arm pivotably attached to the swing arm so as to pivot along a plane parallel to a radius extending from the pivot axis of the swing arm and supporting a spare tire for movement between a raised position wherein the spare tire is located above ground and a lowered position wherein the spare tire substantially contacts the ground;

a tire support fixedly connected to the pivot arm for mounting the spare tire;

a mechanism which secures the pivot arm to the swing arm once the pivot arm is substantially parallel to the swing arm;

a mechanism which secures the swing arm so that it will not pivot; and a winch which provides a mechanical advantage in pivoting the pivot arm.

2. The apparatus of claim 1, wherein the tire support fixedly connected to the pivot arm for mounting the spare tire includes at least one lug for securing the tire to the tire support and material extending past the lug which supports the tire in a manner to permit the tire to rotate and be aligned with the lug.

3. The apparatus of claim 1, wherein said pivot arm is pivotably attached to said swing arm solely at one pivot point on said swing arm.

4. The apparatus of claim 1, wherein the winch which provides a mechanical advantage comprises a manual winch.

5. The apparatus of claim 4, wherein the tire support fixedly connected to the pivot arm for mounting the spare tire includes at least one lug for securing the tire to the tire support and material extending past the lug which supports the tire in a manner to permit the tire to rotate and be aligned with the lug.

* * * * *